Feb. 13, 1940.   W. W. KNIGHT   2,190,266
APPARATUS FOR TREATING RUBBER
Filed April 11, 1936
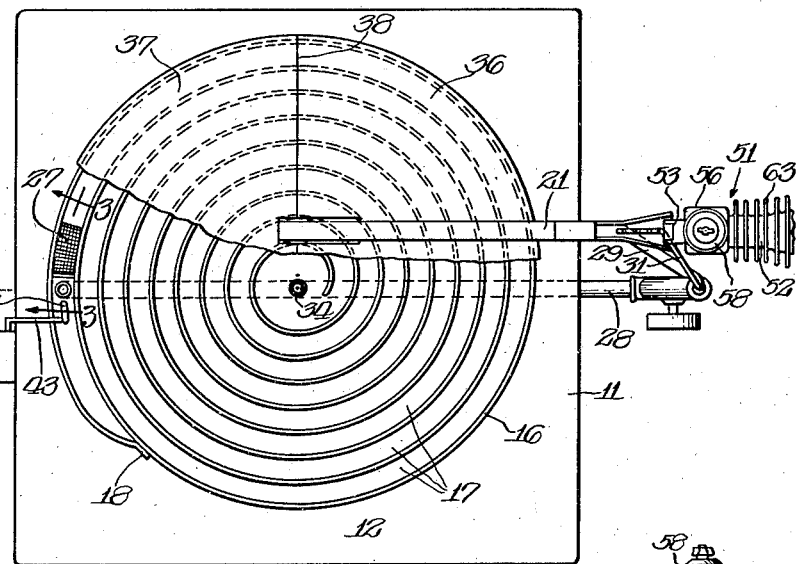
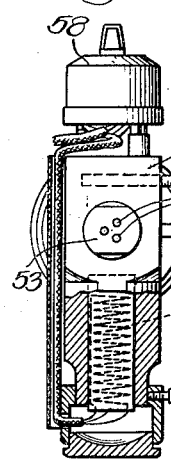
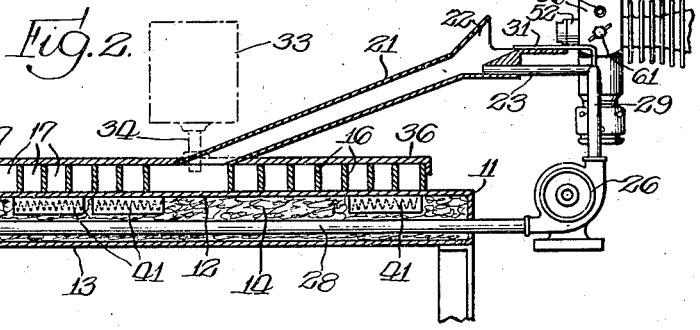
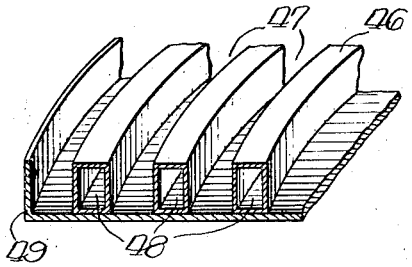
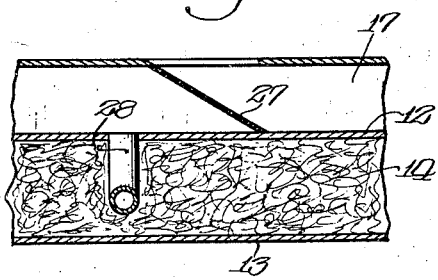
Inventor:-
William W. Knight,
By Foorman L. Mueller Atty.

Patented Feb. 13, 1940

2,190,266

UNITED STATES PATENT OFFICE 2,190,266

APPARATUS FOR TREATING RUBBER

William W. Knight, Cicero, Ill., assignor to Roth Rubber Company, Cicero, Ill., a corporation of Illinois Application April 11, 1936, Serial No. 73,822

9 Claims. (Cl. 18—6)

This application relates to apparatus for continuously vulcanizing rubber, and especially to such apparatus for vulcanizing rubber which is continuously formed into a strip, as by extrusion.

In the Fisher Patent No. 1,661,888, there is disclosed a method of, and means for, continuously vulcanizing rubber stock by passing it through a steam-jacketed pipe with the aid of a current of liquid flowing through said pipe. The liquid serves both for carrying the rubber through the pipe and as a heat transfer medium. In my copending application Serial No. 745,259, I have disclosed apparatus which is similar, although including various improvements. According to the present invention I have devised apparatus which is very much cheaper and more compact, and which furthermore has some advantages in temperature control. An important feature in accomplishing these results is the provision of a spiral trough which provides adequate length in a very small space such as the top of a table. Furthermore, if additional length should be necessary to give a longer path, it is merely necessary to add more convolutions to the spiral, without taking up much additional room.

It is an object of the invention to provide continuous vulcanizing apparatus which is more economical than any heretofore known, both in original cost, and in operation.

It is a further object of the invention to provide such apparatus which is more compact than any heretofore known and which therefore may be used in a very small room if desired, and in its compactness and simplicity requires a minimum amount of labor for operating the same.

Another object of the invention is to provide continuous vulcanizing apparatus in which the temperature may be controlled more readily than in those heretofore known.

Another object of the invention is to provide continuous vulcanizing apparatus in which the heat losses are less than in those heretofore known, thus providing an efficient vulcanizing process, and a high quality, uniformly cured product, from the practice of the process.

Another object of the invention is to improve the extrusion operation by heating the rubber and beginning its vulcanization just prior to its extrusion to give better body to the extruded strip. This also has the advantage of shortening the subsequent vulcanization.

Other objects and advantages of my invention will be apparent from the following description, taken with the drawing, in which:

Fig. 1 is a plan view of one form of my invention chosen for illustration, showing a portion of the cover broken away.

Fig. 2 is a vertical sectional view taken substantially along the line 2—2 of Fig. 1, and showing the extrusion head from the rubber extruding machine.

Fig. 3 is a fragmentary detail view taken substantially along the line 3—3 of Fig. 1.

Fig. 4 is a fragmentary sectional and perspective view of a modification of this invention; and Fig. 5 is an elevation of the extrusion head and heater looking into the extrusion die, with a portion of said structure broken away.

This invention may take numerous forms, although only two have been chosen for illustration. In both of these forms the apparatus includes a heated extrusion head, a spiral passageway for the rubber strip and carrying fluid, which passageway may be open at its top, means for pumping the fluid for causing it to circulate through the spiral trough at the desired speed, and means for heating the fluid in said trough to the desired temperature for vulcanization.

The entire apparatus, or at least the major portion thereof, except the extrusion apparatus, may be embodied in and built on a table 11 which may desirably have a top 12 spaced slightly above an under-panel 13 to form a chamber which may be packed with insulation 14. The cover or top 12 of the table is constructed preferably of sheet metal to permit the walls of the liquid channel to be readily secured thereto. A strip of sheet metal 16 may be secured in edge-up position to this table in the form of a spiral as clearly seen in Fig. 1, thus forming a spiral trough between its convolutions, said trough extending from the center of the table approximately to its edge. The outer end of the strip 16 may be secured as at 18 to an inner convolution. The outer convolution of the strip 16 should be secured to the table top in a water-tight manner so that no water may leak from within this convolution to the outside thereof. This may be accomplished by soldering or welding the convolution to the metal top. Except for this outer convolution it is sufficient if the remainder of the strip is secured to the table top with approximate water-tightness, so that the movement of the liquid and the propelling force thereon will be retained sufficiently to carry the rubber stock completely through the channel. The strip should also be secured with sufficient strength to secure the convolutions in place with the proper spacing.

In a commercial installation of the apparatus of this invention, used primarily to vulcanize rubber cord stock, a spiral liquid channel has been provided which is 35 inches in diameter over the entire apparatus, and with the channel four inches deep and 1⅛ inches wide. These dimensions can of course be varied as desired.

A feed tube 21 is located in any convenient position, with its outlet end opening into the trough 17 near the inner end thereof. If desired, this tube may have two passages 22 and 23 therein, one for the liquid and the other for the rubber stock to be vulcanized. The rubber stock, in strip form or otherwise, is fed from an extrusion machine through an extruding head and die which will be more particularly described hereinafter, and through this feed tube 21 into the trough 17. It is carried through said trough by the liquid which is caused to flow therethrough by any suitable pump 26. As the rubber strip approaches the end of the trough 17 it is drawn out of the trough by any suitable apparatus, not shown, which may wind it up or further treat it at the point where it leaves the trough. A screen 27 may be provided which will permit the liquid to flow therethrough toward the end of the trough 17 while at the same time providing a slanting upwardly extending discharge path, thus facilitating the removal of the rubber strip and preventing the passage of any isolated particles of rubber. Behind the screen 27 an outlet pipe 28 is provided which communicates with the pump 26. The pump 26 has an outlet pipe 29 which communicates with the feed tube 21.

The total length of the channel over which the rubber stock is carried, the speed of movement of the liquid carrier and curing medium, and the temperature of the liquid, as well as the liquid itself, are determined in accordance with the properties of the rubber to be cured.

If the feed tube 21 has two separate passages therein, the liquid may flow through the passage 23 and the rubber through the passage 22, in which case it is preferred that a special spray nozzle 31 be provided for spraying sufficient liquid on the rubber and to the passage 22 to keep the rubber wet and lubricate the passage for the rubber flowing therethrough. This is especially true when a plurality of strips or cords are extruded simultaneously and carried through a single vulcanizing apparatus, because the liquid will then serve to keep them from sticking together, the liquid preferably being sprayed against the strips as they are extruded. This nozzle 31 may be connected to the pipe 29, and may be positioned with respect to the extrusion head for the extruder, and passage 22 as desired.

In order to keep the liquid at exactly the correct depth in the trough 17, a closed reservoir 33 is provided, having a spout 34 projecting downwardly to or slightly below the level at which the liquid should flow. As soon as the liquid gets below the opening of this spout 34, air will be admitted to the reservoir 33, thus permitting more of the liquid to flow therefrom.

To minimize evaporation and heat loss, it is preferred that a cover be provided which may be insulated is desired. This cover preferably includes two halves 36 and 37 which are divided along a line 38 permitting their being inserted about the feed tube 21 and the spout 34. The cover half 37 has an opening 39 therein through which the strip is drawn.

In order to heat the liquid to the temperature desired for the vulcanizing process, one or more electric heaters 41, preferably mounted in suitable insulating material as asbestos, are provided on the under side of the table top 12. Such heaters may desirably extend radially so as to heat the liquids in each of several convolutions of the spiral, especially at the beginning thereof. The heater under the later convolutions may merely add enough heat to make up for heat losses. The heaters are preferably close enough to return pipe 28 to cause the liquid supplied to tube 21 to be of the correct temperature.

Very satisfactory control for the temperature of the liquid in a commercial embodiment of the invention is provided in a thermostat including a liquid filled bulb 42 carried at the outer end of the channel 17, which has a tube 43, connecting with a suitable switch 44 for the electric heaters 41. With this means, the temperature of the vulcanizing liquid may be maintained substantially constant, and by means of the auxiliary liquid supply in the closed reservoir 33 the level of the liquid in the channel may be maintained substantially constant.

The spiral may be formed of a pipe 46 as seen in Fig. 4, instead of the thin strip 16. This pipe is preferably rectangular in cross section and is shaped to form the spiral naturally so it need not be secured to the table. In fact, it is preferred that the spiral simply rest in a tank, fitting snugly against the bottom, but loose so as to permit movement of the coil on the contraction and expansion thereof. Its convolutions are spaced apart so as to form the trough 47 through which the liquid and rubber pass. Steam may be circulated through the hollow passage 48 of the pipe to heat the liquid. If the outer convolution of the pipe is not secured in a fluid-tight manner, a flange 49 may be provided, soldered or welded to the metal table top or integral therewith, to prevent loss of the liquid, or, as suggested above, the spiral coil may be placed within a shallow pan or tank which will be fluid-tight.

In the embodiment of Fig. 4, an inlet, and an outlet similar to that shown in Figs. 1 to 3 may be provided, and a similar liquid circulatory means employed. Likewise the temperature of the liquid in the apparatus, heated by steam in the tubing 46, may be subject to thermostatic control in any desired manner.

Any form of apparatus may be used for forming the rubber strip, but it is preferred that an extrusion apparatus having an extrusion head 51 be used. This extrusion head includes a conduit 52 and an extrusion die 53 which in the illustrated form includes three extrusion openings 54 for extruding three separate cords of rubber. Of course the die, and in fact the entire head, may be varied for extruding different types and shapes of strips, and tubes, and of course the number of strips or tubes extruded may be varied by a change in the die.

It is preferred that the rubber in the front end of the conduit 52 be heated to begin the vulcanization process. This gives the rubber strip issuing from the die 53 better body to assist in retaining its intended shape during at least the early stages of the liquid bath vulcanization. The heat may be applied by a metal block 56 surrounding the end of the conduit 52, said block being elongated and having a heating unit 57 extending therein. The heating unit 57 may be controlled by switch 58 preferably providing a plurality of degrees of heat. A thermometer 59 may be inserted into a suitable hole in the block 56 for determining the temperature of the block, and hence the approximate temperature of the rubber and the position of the switch 58 varied to vary the current input to the unit 57 to maintain the temperature substantially uniform. The entire heating unit may be removable by simply slipping it off of the front end of the conduit 52, and when in place it may be secured firmly by a set screw 61. An automatic thermostat control may, of course, also be utilized for the heating unit.

It is of course desired that this prevulcanizing be accurately controlled and that it should not progress too far before the rubber is extruded. To this end heat dissipating rings 63 are provided on the rear portion of the conduit 52 so that the rubber will not be materially heated more than a short time prior to its reaching the position of the heating block 56.

It is obvious that this heated extrusion head may be used with other types of subsequent vulcanizing apparatus. However, it does have its greatest advantages with this type of vulcanizing apparatus. The extrusion of rubber having a fairly good body and already partially vulcanized and existing at a vulcanizing temperature, followed by carrying it in a liquid at vulcanizing temperature for the remainder of the vulcanization, results in a strip or other shaped object of rubber which is not distorted by the vulcanizing process and which is vulcanized in the minimum of time without any loss of time due to heating the rubber after it enters the liquid.

In the present invention I therefore provide an apparatus for shaping and vulcanizing rubber in various forms, but preferably rubber in a continuous strip, such as a core, tube, or like form, although spherical or similarly shaped objects may also be formed and vulcanized. The apparatus occupies a relatively small amount of space, and may be operated with high efficiency and low cost. The apparatus itself may be constructed at a very low cost. Being provided in table form and height, as described above, it is very easy for the operator to closely supervise the operation of the apparatus, and, being so compact, can be handled by one operator, or even, in a much larger installation, by a very minimum number of operators. The apparatus of my invention furthermore readily lends itself to enlargement, or to constriction in size at a small cost, and in the structure disclosed, or a similar one, solves the problem of heating and heat control in a very simple manner.

Although I have disclosed the invention in its preferred embodiments, it is understood that I am not limited thereby, but limit my invention only by the scope of the appended claims.

I claim.

1. Apparatus for continuous vulcanization of rubber including a trough open along its length, and means for heating a liquid and flowing it through said trough, to carry said rubber therethrough and to heat it to the vulcanizing temperature, said trough being arranged in a spiral path having a plurality of adjacent convolutions.

2. Apparatus for vulcanizing rubber, including a conduit shaped to form a spiral of several revolutions, means for heating a liquid and causing it to flow substantially from one end of said spiral to the other, including an inclined screen approximately at the end of said spiral for permitting the liquid to pass therethrough while urging the rubber upwardly from said conduit.

3. Apparatus for continuous vulcanization of rubber including a conduit, means for heating a liquid and flowing it through said conduit to carry said rubber therethrough and to heat it to the vulcanizing temperature, and an inclined trough for feeding rubber to said conduit, said means including means for causing some of the liquid to flow through said trough for lubricating it for the rubber.

4. Apparatus for vulcanizing rubber, including a conduit shaped to form a spiral of several revolutions, means for heating a liquid and causing it to flow substantially from one end of said spiral to the other, and a feed conduit extending approximately from the inner end of said spiral to a point over the periphery thereof to make said apparatus fit existing rubber forming machines.

5. Rubber forming and vulcanizing apparatus including an extrusion nozzle, means for heating the rubber as it is supplied to said nozzle to begin its vulcanization, means to apply lubricant to said rubber as it leaves said nozzle, a spiral passage, and means for supplying a heated liquid and said extruded rubber thereto, and causing them to circulate through said spiral passage to complete the vulcanization of said rubber.

6. Apparatus for continuous vulcanization of rubber including a spiral trough for carrying a moving vulcanizing medium therein, means for introducing a strip of unvulcanized rubber at the inside of said spiral with said strip being carried by said vulcanizing medium to the outside portion of said spiral trough, means at said outside portion of the trough to guide said rubber strip therefrom, and means outside said trough for carrying the vulcanizing medium from said outside trough portion to a point adjacent the point of introduction of said rubber strip for continuous vulcanization of rubber.

7. Apparatus for vulcanizing an extruded rubber strip including a circular shallow tank of relatively small diameter having an extended spiral trough therein, a feed channel extending from an extruding machine and opening into said spiral trough at the inner end thereof to carry rubber strip to said trough, a vulcanizing liquid circulating in said trough to carry said rubber strip therethrough and simultaneously vulcanize the same, an outlet at the outside end portion of said spiral trough to permit the outflow of the vulcanizing liquid, and guide means for said rubber strip in said trough ahead of said outlet to guide said strip out of said trough and vulcanizing apparatus.

8. Apparatus for vulcanization of rubber including a trough open along its length, said trough being formed by a flat member and a metal hollow tube carried on said flat member in a single layer, in a manner to be maintained thereon in a relatively fixed position and wound in the form of a spiral to act as a spacer wall to form said trough intermediate two adjacent convolutions, means for heating a liquid and flowing it through said trough including a heating medium in said hollow tube bordering on and forming said trough.

9. Apparatus for vulcanization of rubber including a pan having a flat bottom and a side wall around the outer edge thereof, a trough in said pan open along its length, said trough being formed by a metal hollow tube non-circular in cross-section positioned in said pan and maintained relatively fixed therein with said tube laying in a single layer in the form of a spiral with adjacent convolutions spaced apart sufficiently to provide the trough therebetween, means for heating a liquid adapted to flow in said trough to carry vulcanizable rubber therein including a heating medium in said tube bordering on and forming said trough.

WILLIAM W. KNIGHT.